US007340661B2

(12) United States Patent
Groz (10) Patent No.: US 7,340,661 B2
(45) Date of Patent: *Mar. 4, 2008

(54) COMPUTER PROGRAM PRODUCT FOR PERFORMING TESTING OF A SIMULATED STORAGE DEVICE WITHIN A TESTING SIMULATION ENVIRONMENT

(75) Inventor: Peter Groz, Gilroy, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 693 days.

This patent is subject to a terminal disclaimer.

(21) Appl. No.: 10/670,548

(22) Filed: Sep. 25, 2003

(65) Prior Publication Data

US 2005/0071126 A1    Mar. 31, 2005

(51) Int. Cl.
*G06F 11/00* (2006.01)

(52) U.S. Cl. ...................... 714/741; 714/742
(58) Field of Classification Search ............... 714/33, 714/41; 434/29; 703/20, 19, 6; 716/5
See application file for complete search history.

(56) References Cited

U.S. PATENT DOCUMENTS

| 4,759,019 | A | | 7/1988 | Bentley et al. |
| 4,999,837 | A | | 3/1991 | Reynolds et al. |
| 5,008,885 | A | | 4/1991 | Huang et al. |
| 5,130,988 | A | | 7/1992 | Wilcox et al. |
| 5,146,460 | A | * | 9/1992 | Ackerman et al. ............ 714/33 |
| 5,425,036 | A | | 6/1995 | Liu et al. |
| 5,428,624 | A | | 6/1995 | Blair et al. |
| 5,475,624 | A | | 12/1995 | West |
| 5,671,352 | A | * | 9/1997 | Subrahmaniam et al. ..... 714/41 |
| 5,699,502 | A | | 12/1997 | Swanberg et al. |
| 5,841,960 | A | | 11/1998 | Ibusuki et al. |
| 6,106,298 | A | * | 8/2000 | Pollak ......................... 434/29 |
| 6,167,479 | A | | 12/2000 | Hartnett et al. |
| 6,182,248 | B1 | | 1/2001 | Armstrong et al. |
| 6,208,955 | B1 | * | 3/2001 | Provan et al. ................ 703/20 |
| 6,263,303 | B1 | * | 7/2001 | Yu et al. ....................... 703/19 |
| 6,339,837 | B1 | * | 1/2002 | Li ................................. 716/5 |
| 6,353,898 | B1 | | 3/2002 | Wipfel et al. |
| 6,826,518 | B1 | * | 11/2004 | Ivezic et al. ................... 703/6 |
| 6,985,842 | B2 | * | 1/2006 | Grupp et al. ................. 703/15 |

FOREIGN PATENT DOCUMENTS

EP    0376034 A2    7/1990

OTHER PUBLICATIONS

Lim et al., "Direct Access Storage Device (DASD) Modeling and Validation", 1989 IEEE, pp. 1024-1029.*
J.W. Eckel, R.E. Floyd, J.C. Mahlbacher and R.C. Stanley, "Large System Diagnostics with Minimal Hardware", IBM Technical Disclosure Bulletin, Apr. 1989, vol. 31, No. 11, pp. 367-369.
Z. Barzilai, J.L. Carter, L.M. Huisman, E. Kronstadt, B.K.Rosen and J.D. Rutledge, "Fault Simulation on the YSE/EVE" IBM Technical Disclosure Bulletin, Jul. 1985, vol. 28, No. 2, pp. 773-776.

* cited by examiner

*Primary Examiner*—David Ton
(74) *Attorney, Agent, or Firm*—Lewis L. Nunnelley; Dillon & Yudell LLP (57) ABSTRACT

A computer program product for performing testing of a simulated direct access storage device in a testing simulation environment is disclosed. The computer program product provides a software representation of a plurality of hardware components within the simulated direct access storage device. The computer program product also uses a control program module within the testing simulation environment, wherein the control program module interacts with the software representation of the plurality of hardware components, and a testing program for interacting with the control program module and the software representation of the plurality of hardware components. In response to detection of an occurrence of a pre-selected event within the simulated direct access storage device, one or more codes are sent from the testing program to the software representation of the plurality of hardware components and whether or not a response by the control program module to the one or more codes is correct is determined.

20 Claims, 4 Drawing Sheets

COMPUTER PROGRAM PRODUCT FOR PERFORMING TESTING OF A SIMULATED STORAGE DEVICE WITHIN A TESTING SIMULATION ENVIRONMENT

CROSS-REFERENCE TO CO-RELATED APPLICATION

The present invention is related to the subject matter of the following commonly assigned, co-pending U.S. patent application Ser. No. 10/670,547 entitled "Method for Performing Testing of a Simulated Storage Device Within a Testing Simulation Environment" and filed Sep. 25, 2003, which is incorporated herein by reference.

BACKGROUND OF THE INVENTION

1. Technical Field

The present invention relates in general to an improved computer program product for testing and verification, and, in particular, to an improved computer program product for testing and verification in a simulated-hardware environment. Still more particularly, the present invention relates to an improved computer program product for performing testing of a simulated direct access storage device within a simulation environment.

2. Description of the Related Art

The modern trend toward constant and rapid improvement in technology has forced technology companies to adapt to a market environment where the saleable life of a technology is limited and frequently prematurely terminated by the frenetic pace of innovation. In order to maximize the useful life of a product when facing a shrinking window of time between commercialization of an invention and displacement by superior innovations, technology companies have undertaken every possible effort to reduce product cycle time. Manufacturers frequently turn to virtual prototyping and simulation testing techniques to enable them to test products before the design reaches the factory floor. Virtual prototyping and simulation testing techniques carry the added benefit of reducing the cost of development. But as will be discussed below, current virtual prototyping and simulation testing techniques also add risk and costs to the design process.

Simulation testing techniques inject unique complications into the design and testing of complex technological products. A recurring and somewhat daunting problem relates to the need to test the interaction of separate systems, both of which are in development at the same time, to external stimuli. Where separate systems such as underlying hardware and control software form integral parts of the product delivered to the customer, integration testing must be used to verify that the parts will, in fact, perform together as specified. Particularly in modern data processing and storage systems, where the hardware and software form equally critical parts of the product, it is necessary to rigorously test their interactions.

Testing the interaction of the hardware-under-development with the software-under-development sounds inherently simple; one need only produce a prototype of the hardware and then monitor the performance of the control software on the completed hardware platform. The unfortunate reality is that time-sensitive cycles of parallel development often require integration testing of the software and the underlying hardware prior to production of the hardware itself. Testing must frequently occur before a working prototype of the hardware exists.

In the direct access storage device industry, as in many others, the answer has been to produce a virtual prototype of the relevant hardware. The virtual prototype is a data processing system program, operating in a testing simulation environment, which models the expected behavior of the hardware. In order to perform integration testing, a specially engineered version of the software under development is conventionally loaded into the simulation environment and sends commands to the virtual hardware. Such methods have allowed for testing of the expected interactions of non-existent hardware with the software designed to control the virtual hardware, but the use of a specially engineered version of the software carries its own problems.

Current testing methods call for the insertion of special program instructions into the software, which will presumably be removed from the software at a later time. As an example, a testing and verification group might need to determine the combined response of the software and the hardware to the presence of a thermal abnormality in the underlying hardware. To do this, lines of code in the software will be inserted, which will, in effect, write a thermal error code to the underlying hardware. The hardware will then react to this error code, taking some measures based on its own firmware, and passing the error back to the software for further scrutiny.

The first, and most obvious problem with this approach, is that integration of the special error-code instructions into the software-under-development changes the performance dynamics of the software. Machine cycle times are skewed by the need to perform the lines of code that pass error codes to the hardware. This reduces the accuracy of the simulation by causing the development and testing version of the software to exhibit behavior that will not be present in the production version of the software. Because the timing of microprocessor operations can prove critical to successful operation of the completed system, this mere problem of timing due to presence of testing instructions can severely cripple the usefulness of the integration testing. Injecting work-arounds to correct for delays in software operation can introduce an added factor of unreliability. Simply put, the fidelity of the test to the software that will actually form a component of the finished product is substantially undermined.

Another problem relates to the burdensome nature of manual insertion of the testing commands into the software-under-development. The manpower involved in properly coding the test instructions into the software-under-development adds cost to the development process and creates version management issues. Frequently, a separate testing and verification group, composed of persons less familiar with the software-under-development than the people who have written the software, performs the integration testing. The cost of providing the testing and verification team with the requisite familiarity with the underlying software, and then having them perform, and later remove, changes to the software, adds materially to the cost and number of skilled programmers necessary to deliver the product. The fact that the changes to the software necessary to facilitate testing must be made manually also discourages thoroughness in testing by imposing an unacceptably high time-cost for each test performed.

Finally, the presence of human error in the process of testing creates real problems. One such problem is the problem of version management. Once simulation testing has begun, the programmers, who are developing the software, must take care not to make revisions to the software without insuring that the revisions are passed to the testing and verification group. Frequently, in order for the testing and verification group to make the modifications that need to be made in order to test the software, they must isolate the code from further tinkering by the software design team. The frequently unhappy result is that revisions to the software are lost because the revisions are not inserted into the most current version-under-test, or that they are inserted and are never tested because the testing and verification group had no notice of the insertion of the code. Occasionally, testing and verification instructions are inadvertently left in the software product after testing is completed, causing the finished product to display anomalous behavior that was not anticipated by the designers.

All of the above-mentioned problems undermine the effectiveness of current testing techniques, and a remedy that would both lower the cost and increase the effectiveness of simulation testing is desired. What is needed is a separation of the testing function from the development of software through a computer program product for simulation testing that automates the error code process and removes the need to insert testing instructions into the software-under-development.

SUMMARY OF THE INVENTION

A computer program product for performing testing of a simulated direct access storage device in a testing simulation environment is disclosed. The computer program product provides a software representation of a group of hardware components within a simulated direct access storage device. The computer program product also uses a control program module within the testing simulation environment, wherein the control program module interacts with the software representation of the hardware components, and a testing program for interacting with the control program module and the software representation of the plurality of hardware components. In response to detection of an occurrence of a pre-selected event within the simulated direct access storage device, one or more codes are sent from the testing program to the software representation of the hardware components and the correctness of a response by the control program module to the one or more codes is determined.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF THE INVENTION

Figure 1:
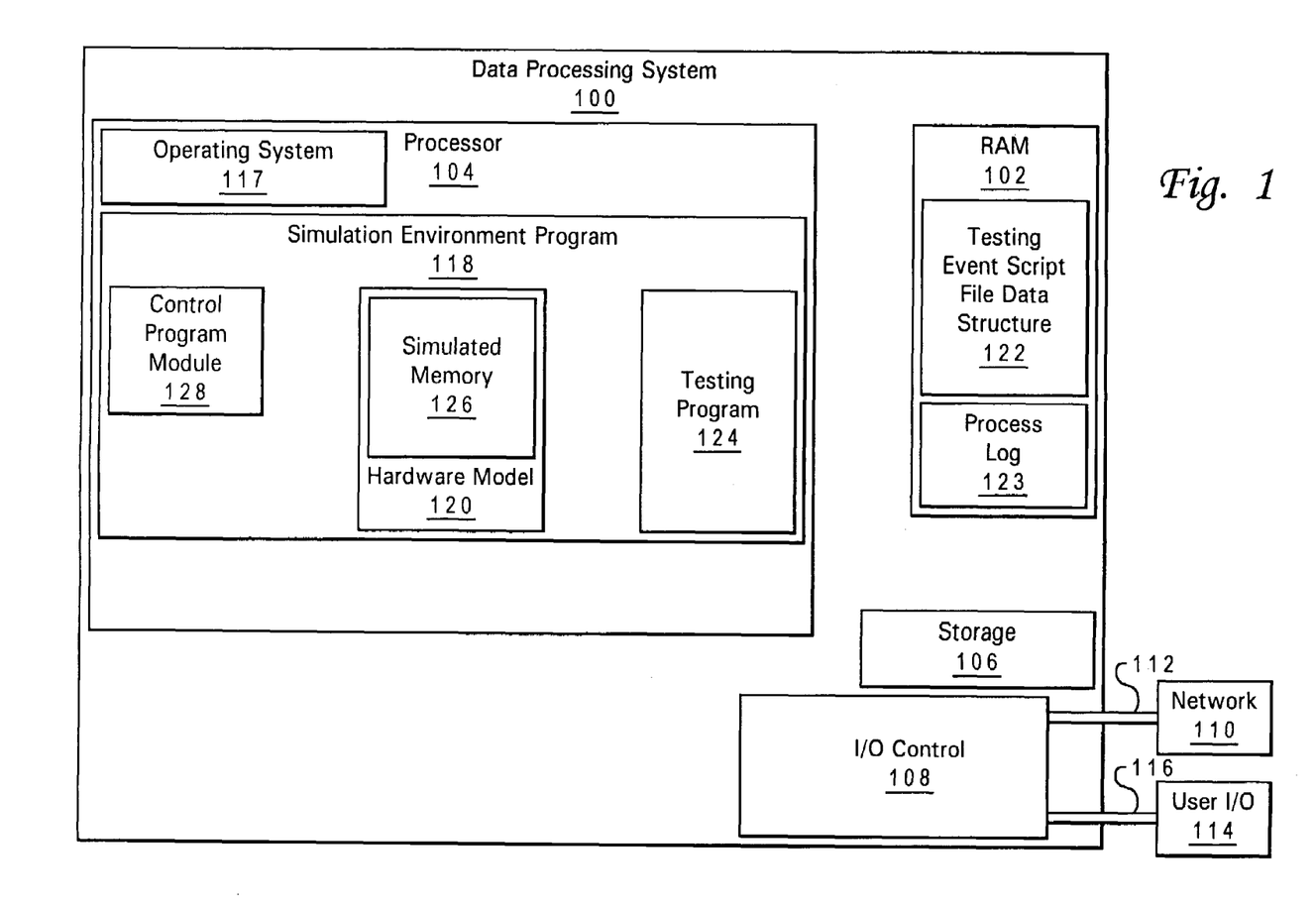
FIG. 1 is a block diagram of a data processing system equipped with a behavior-simulation environment program, in accordance with a preferred embodiment of the present invention.

With reference now to the figures, and in particular with reference to FIG. 1, a data processing system equipped with a behavior-simulation environment program, in accordance with a preferred embodiment of the present invention, is illustrated. For purpose of simplicity in explanation, many components of a data processing system have been omitted from FIG. 1, and only those parts necessary to facilitate an understanding of the invention have been included. All components of a data processing system that have been omitted from FIG. 1 are well known to those skilled in the data processing arts at the time of the invention, though other substitute components may later be developed and substituted without departing from the scope of the present invention.

A data processing system 100, contains a processing storage unit or a RAM 102 and a processor 104. Data processing system 100 also includes a unit of storage 106 such as a hard disk drive or other direct access storage device. An Input/Output (I/O) control unit 108 provides connectivity to a network 110 through a connectivity device such as a network cable 112. I/O control 108 connects to one or more units of user I/O 114 such as one or more of a keyboard, monitor, and printer through the use of connecting means 116, such as cables or wireless linkages.

Processor 104 executes programs in the course of performing the present invention. An operating system 117 includes instructions to manage the interactions of processor 104, RAM 102, I/O control 108, and storage 106. In a preferred embodiment of the present invention, processor 104 executes a simulation environment program 118. Simulation environment program 118 calls for the execution of instructions contained in a hardware model 120, containing a simulated memory 126, a testing program 124, and a control program module 128.

Within RAM 102, data processing system 100 stores several items of data and instructions, while operating in accordance with a preferred embodiment of the present invention. These include a testing event script file data structure 122 and a process log 123. One skilled in the data processing arts will quickly realize that additional components of data processing system 100 may be added to or substituted for those shown without departing from the scope of the present invention.

Simulation environment program 118 includes a computer program product, stored in RAM 102 and executed on processor 104, which provides a series of tools for behavior-simulation testing. Generally speaking, simulation environment program 118 contains rule-based instructions for predicting the behavior of logically or mathematically modeled items of hardware and software. Simulation environment program 118 uses the series of rules contained in its own instructions, in conjunction with one or more of hardware model 120, testing program 124, and control program module 128 to predict the response of hardware model 120 and control program module 128 to external and internal stimuli contained in testing event script file data structure 122, which contains error codes and debug instructions.

Depending on what items of hardware are under test, hardware model 120 may model the designs of many different kinds of hardware, but preferably provides a software representation of direct access storage device control components such as microprocessors and application specific integrated circuits (ASIC)s, in a direct access storage device. In some tests, such as those where a new control program module 128 is under development for application to completely developed hardware, hardware model 120 may contain a model of previously deployed hardware. In other tests, such as those where an entirely new hardware platform is being developed with no existing hardware, hardware model 120 may model the designs of an entire system of hardware that has not yet been produced.

Simulation environment program 118 records results of the interaction of hardware model 120 and control program module 128 to external and internal stimuli contained in testing event script file data structure 122 to process log 123, a result recording file. Simulation environment program 118 may also report the contents of process log 123 or the status selected indicators of the status of hardware model 120 and control program module 128 to user I/O 114 through the use of connecting means 116, such as cables or wireless linkages. Additionally, all or part of simulation environment program 118, testing program 124, operating system 117, testing event script file data structure 122, hardware model 120, control program module 128, and process log 123 may, at times, be stored in storage 106 or in RAM 102.

Figure 2:
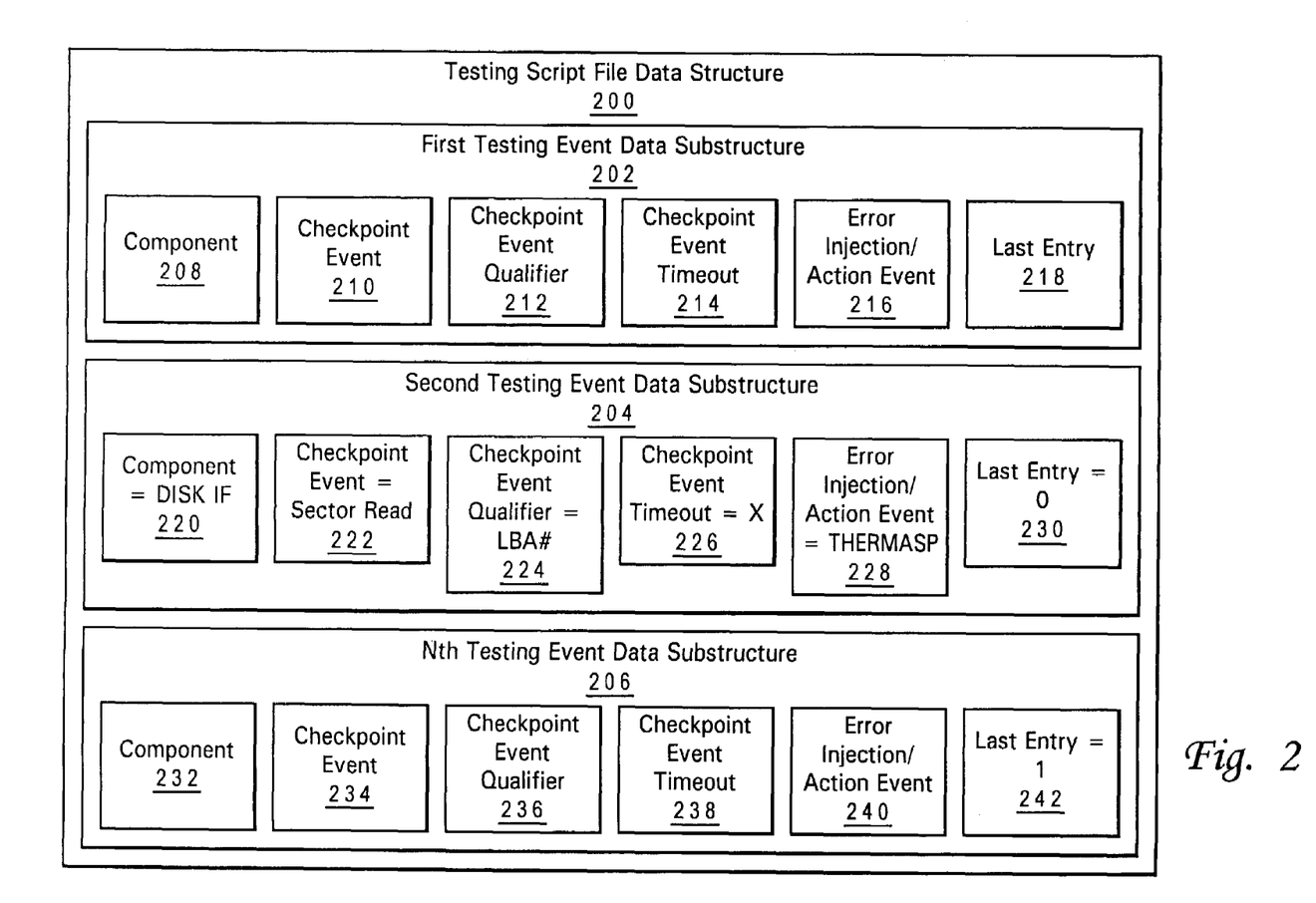
FIG. 2 is a block diagram of a testing script file data structure, in accordance with a preferred embodiment of the present invention.

Turning now to FIG. 2, a testing event script file data structure, containing test events, in accordance with a preferred embodiment of the present invention, is depicted. For purpose of simplicity in explanation, some components of a testing event script file data structure 200 have been omitted from FIG. 2, and only those parts necessary to facilitate an understanding of the invention have been included. All components of a testing event script file data structure 200 that have been omitted from FIG. 2 are well known to those skilled in the data processing arts at the time of the invention, though other substitute components may later be developed and substituted without departing from the scope of the present invention. Testing event script file data structure 200, labeled in the previous FIG. 1 as testing event script file data structure 122, will typically contain one or more testing event data substructures. Testing event script file data structure 122 and testing event script file data structure 200 are interchangeable labels reflecting the same component. Testing event script file data structure 200 may contain as few as one testing event data substructure or a hypothetically limitless plurality of testing event data substructures.

In a preferred embodiment presented in FIG. 2, three such testing event data substructures have been included. These testing event data substructures are a first testing event data substructure 202, a second testing event data substructure 204, and an nth testing event data substructure 206. In the preferred embodiment depicted in FIG. 2, each testing event data substructure contains six fields. First testing event data substructure 202 contains a component data field 208, a checkpoint event data field 210, a checkpoint event qualifier data field 212, a checkpoint event timeout data field 214, an error injection/action event data field 216, and a last entry data field 218. To aid in explanation of the invention, all of the data fields in first testing event data substructure 202 and most of the date fields in nth testing event data substructure 206 have been left blank. The data fields in second testing event data substructure 204 have been filled with hypothetical values to facilitate discussion through an example of testing data, as has a part of $n^{th}$ testing event data structure 206.

Component data field 208 indicates the simulated hardware subsystem on which the action described in first testing event data substructure 202 will operate. On a machine language level, simulation environment 118 translates the value of component data field 208 with the aid of hardware model 120 to ascertain the memory registers in simulated memory 126 designated for action by component data field 208. The memory registers in simulated memory 126, called for in component data field 208, are then set to values called for by first testing event data substructure 202. In second testing event data substructure 204, component data field 220 indicates that the simulated hardware subsystem on which the action described in second testing event data substructure 204 operates is the disk interface subsystem.

Checkpoint event data field 210 describes the event, for which testing program 124 will wait, before performing action described in first testing event data substructure 202. In second testing event data substructure 204, checkpoint event data field 222 indicates that the event, for which testing program 124 will wait before performing action described in second testing event data substructure 204, is a sector read.

Checkpoint event qualifier data field 212 describes additional details of the event described in checkpoint event data field 210. In second testing event data substructure 204, checkpoint event qualifier data field 224 indicates that the event, for which testing program 124 will wait before performing action described in second testing event data substructure 204, is a sector read returning a value that matches the variable LBA#.

Checkpoint event timeout data field 214 describes the length of time that testing program 124 will wait for the occurrence of the event described in checkpoint event data field 210. In second testing event data substructure 204, checkpoint event timeout data field 226 indicates that testing program 124 will wait a length of time equal to the variable x, before a timeout causes the event described in second testing event data substructure 204 to fail.

Error injection/action event data field 216 describes the event that testing program 124 will perform after the occurrence of the event described in checkpoint event data field 210. In second testing event data substructure 204, error injection/action event data field 228 indicates that testing program 124 will pass a thermal asperity error code to the simulated disk interface.

Last entry data field 218, represents a flag set to inform testing program 124 that it has reached the end of testing event script file data structure 200. In second testing event data substructure 204, last entry data field 218 indicates that second testing event data substructure 204 is not the end of testing event script file data structure 200. However, in $n^{th}$ testing event data substructure 206, where component data field 232, checkpoint event data field 234, checkpoint event qualifier data field 236, checkpoint event timeout data field 238, and error injection/action event data field 240, have been left blank for the sake of simplicity in explanation, last entry data field 242 is set to the value of one. Last entry data field 242 is set to the value of one to indicate to testing program 124 that it has reached the end of testing event script file data structure 200.

Reading the test event described in second testing event data substructure 204, then, while simulating the operation of the simulated hardware, testing program 124 waits for the length of time X for a sector read event, wherein the value returned matches the variable LBA#. Once that condition has been met, the disk interface simulated component would be instructed to generate an event simulating the detection of a thermal asperity.

One skilled in the data processing arts will quickly realize that additional components of testing script file data structure 200 may be added to or substituted for those shown without departing from the scope of the present invention.

Figure 3:
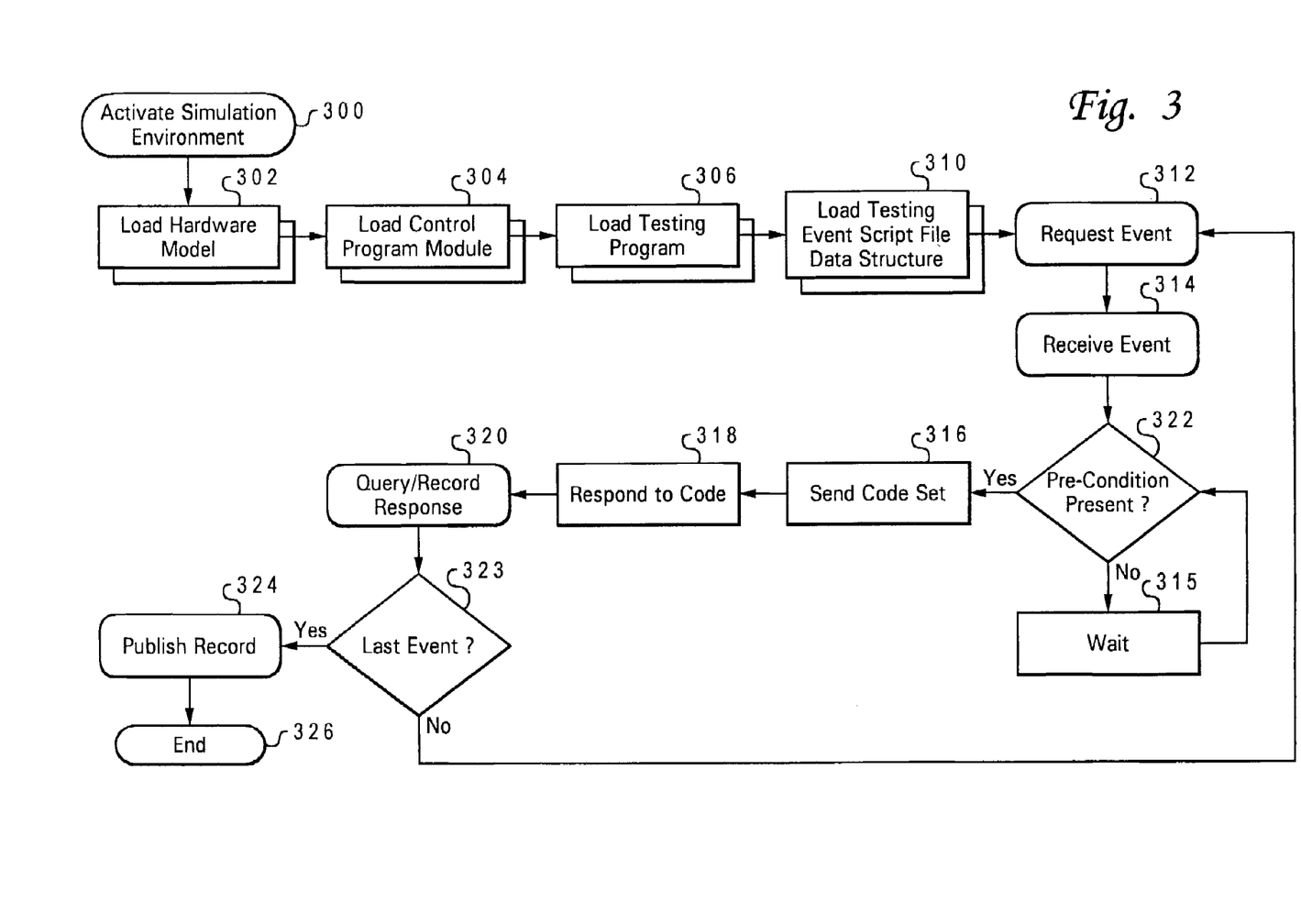
FIG. 3 is a flowchart of a process for performing test events in a behavior-simulation environment, in accordance with a preferred embodiment of the present invention.

With reference now to FIG. 3, a high-level flowchart of a process for performing test events in a behavior simulation environment, in accordance with a preferred embodiment of the present invention, is illustrated.

The process begins at step 300, which depicts activating a simulation environment program 118, in accordance with the preferred embodiment of the present invention. Activating a simulation environment program 118 involves sending initial component instructions from simulation environment program 118 from storage 106 to RAM 102 and executing initial instructions on processor 104.

The process then proceeds to step 302, which illustrates the preferred embodiment of the present invention loading a hardware model 120. Hardware model 120 includes direct access storage device control components such as microprocessors and application specific integrated circuits, called ASICs. In some tests, such as those where a new control program module 128 is under development for application to completely developed hardware, hardware model 120 may contain parameters to model a set of components that already exists in a corporeal embodiment. In other tests, such as those where an entirely new hardware platform is being developed with no existing hardware, hardware model 120 may model the designs of an entire system that has not been produced.

The process then moves to step 304, which depicts the preferred embodiment of the present invention loading control program module 128. Next, the process enters step 306, which shows the preferred embodiment loading a testing program 124. The process next proceeds to step 310, which depicts the preferred embodiment of the present invention loading a testing event script file data structure 200.

The process then moves to step 312, which depicts the testing program 124 requesting testing event data substructure 202 from the testing event script file data structure 122 stored in RAM 102. The process then proceeds to step 314, which depicts the testing program 124 receiving testing event data substructure 202.

The process next moves to step 322, which depicts testing program 124 determining whether the pre-condition to the testing event is present. To do this, testing program 124 determines whether the condition described in checkpoint event 210 has occurred as described in checkpoint event qualifier 212. If the testing program determines that the condition described in checkpoint event 210 has not occurred as described in checkpoint event qualifier 212, the process then proceeds to step 315, which illustrates the process waiting a pre-defined length of time, and the process then returns to step 322. In second testing event data substructure 204, while the simulation environment 118 is simulating the operation of hardware model 120, the disk interface simulated component of the ASIC would wait a length of time X for a sector read event to return the value stored in the variable LBA#. Once a sector read event returns the value stored in the variable LBA#, the process moves to step 316 as described below.

If the testing program determines that the condition described in checkpoint event 210 has occurred as described in checkpoint event qualifier 212, then the process moves to step 316, which depicts sending a code set to simulated memory 126. In second testing event data substructure 204, while the simulation environment 118 simulates the operation of hardware model 120, the testing program writes a code set simulating the detection of a thermal asperity to simulated memory 126. This event is preferably injected into the simulation to detect the response of the system to a thermal error.

The process then proceeds to step 318, which depicts the control program module 128 responding to the thermal asperity code. The process next moves to step 320, which illustrates the testing program querying and recording the response of control program module 128 and hardware model 120 to the event in step 316. Such recording is preferably performed through the use of command lines in testing event script file data structure 122, which includes commands to monitor and record variables in the simulation.

The process then moves to step 323, which illustrates the testing program 124 checking last entry data field 218, which represents a flag set to inform testing program 124 that it has reached the end of testing event script file data structure 122, also labeled as testing event script file data structure 200. In second testing event data substructure 204, last entry data field 218 indicates that second testing event data substructure 204 is not the end of testing event script file data structure 200. However, in $n^{th}$ testing event data substructure 206, last entry data field 242 is set to the value of one. That last entry data field 242 is set to the value of one to indicate to simulation environment program 118 that it has reached the end of testing event script file data structure 200.

If testing program 124 discovers that it has reached the last entry in testing event script file data structure 122, then the process next proceeds to step 324, which depicts testing program 124 publishing a record of its results. This step includes storing process log 123 in storage 106 and may include delivery of a performance report to user I/O 114. Once step 324 is completed, the process moves to step 326, which illustrates testing program 124 ending the process of the preferred embodiment of the present invention.

If, in step 323, testing program 124 does not conclude that it has reached the last entry in testing event script data structure 122, then the process next proceeds to step 312, which depicts testing program 124 requesting the next event data substructure 202 from the testing event script file data structure 122 stored in RAM 102.

Figure 4:
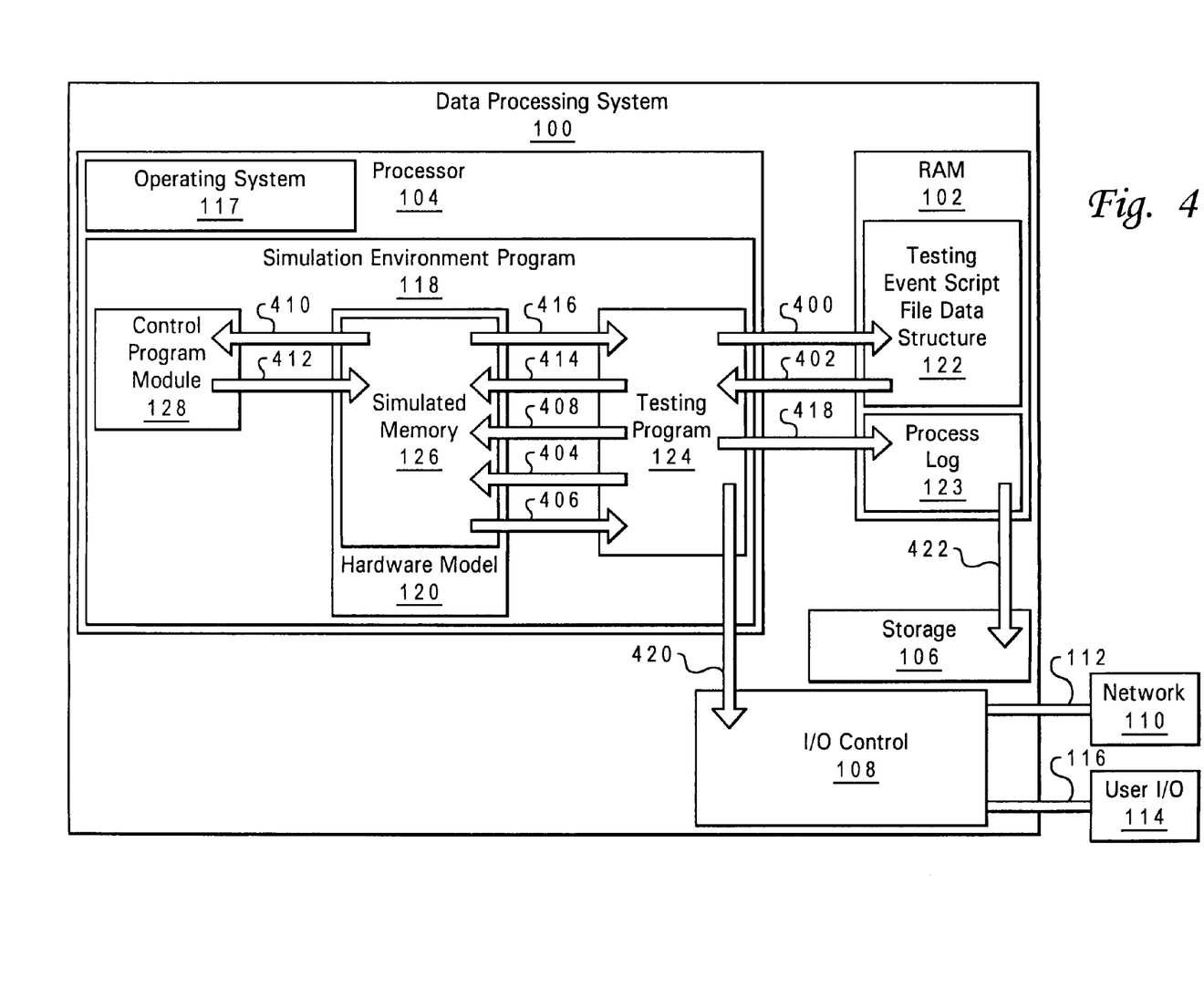
FIG. 4 is a block diagram illustrating message flow between the components of a data processing system for the process of performing test events in a behavior-simulation environment, in accordance with a preferred embodiment of the present invention.

Turning now to FIG. 4, a block diagram of message flow between the components of a data processing system for the process of performing test events in a behavior simulation environment, in accordance with a preferred embodiment of the present invention, is depicted. The message flow diagram of FIG. 4. illustrates the execution of a test event as in steps 312 through 326 of FIG. 3 and will be discussed with reference to them.

The test event begins with step 312 of FIG. 3, which depicts the testing program 124 requesting testing event data substructure 202 from the testing event script file data structure 122 stored in RAM 102. This is typically accomplished when processor 104 sends a 'what is next event' query 400 to RAM 102.

The process depicted in FIG. 3 then proceeds to step 314, which depicts the testing program 124 receiving testing event data substructure 202. This is accomplished when RAM 102 sends 'next event is' instruction 402 to testing program 124 on processor 104 from testing event script file data structure 122 on RAM 102. For purposes of this discussion, the invention will be further described on the assumption that second testing event data substructure 204, described with respect to FIG. 2, was sent by RAM 102 as 'next event is' instruction 402 to testing program 124 on processor 104. Analyzing second testing event data substructure 204, processor 104 will use instructions contained in testing program 124 and simulation environment 118 to determine that component data field 220 indicates that the simulated hardware subsystem, on which the action described in second testing event data substructure 204 operates, is the disk interface subsystem.

The process depicted in FIG. 3 next moves to step 322, which depicts testing program 124 determining whether the pre-condition to the testing event is satisfied. This is accomplished by testing program 124 sending a 'checkpoint status' query 404 to simulated memory 126 through the messaging capabilities of the testing simulation environment 118. Here, the 'checkpoint status' query 404 will request the latest sector read as in second event data testing structure 204. Simulated memory will reply to the 'checkpoint status' query 404 with a 'checkpoint value' message 406. For purposes of explanation, we will assume that the 'checkpoint value' message 406 returns the value 'LBA#' specified in checkpoint event qualifier 224.

Having satisfied the checkpoint condition required in step 322, the process depicted in FIG. 3 would next progress to step 316, which depicts sending a code set to simulated memory 126. In second testing event data substructure 204, then, while the simulation environment program 118 is simulating the operation of the hardware model 120, the testing program would write to simulated memory 126 a code set simulating the detection of a thermal asperity. This is accomplished by the testing program 124 sending an 'error code value' message 408 to the simulated memory 126 by writing the value of an error code to simulated memory 126. Though the exemplary 'error code value' message 408 illustrated in FIG. 4 contains only an error code, it could also contain debugging instructions in addition to the error code.

The process depicted in FIG. 3 then proceeds to step 318, which depicts the control program module 128 and hardware model 120 responding to the thermal asperity code. This is accomplished as simulated memory 126 sends 'request instruction' 410 message to control program module 128 and receives an 'instructions' reply 412. Hardware model 120 carries out the instructions contained in 'instructions' reply 412. Simulation environment program 118 will track the cycle times of interaction between control program module 128 and hardware model 120 to achieve a real-time processing of the error code response and will suspend tracking the 'clock time' of control program module 128 and hardware model 120 while performing operations that reside in the testing program 124 or simulation environment program 118.

The process described in FIG. 3 next moves to step 320, which illustrates the testing program querying and recording the response of the simulated hardware to the code set in step 316. Such recording is performed through the use of command lines in testing event script file data structure 122, which includes commands to monitor and record variables in the simulation. Querying and recording are accomplished in FIG. 4 as testing program 124 sends a 'provide response' query 414, which will typically read the value of a register in simulated memory 126 and simulated memory responds with a 'response answer' message 416, which will typically contain the value of a register in simulated memory 126. Testing program 124 will typically then process the result obtained in response answer message 416 and report the result to process log 123 in RAM 102 by sending a 'store report' message 418 to process log 123 in RAM 102.

The process described in FIG. 3 then moves to step 323, which illustrates the testing program 124 checking last entry data field 218, which represents a flag set to inform testing program 124 that it has reached the end of testing event script file data structure 200. In second testing event data substructure 204, last entry data field 218 indicates that second testing event data substructure 204 is not the end of testing event script file data structure 200. However, in $n^{th}$ testing event data substructure 206, last entry data field 242 is set to the value of one. That last entry data field 242 is set to the value of one to indicate to testing program 124 that it has reached the end of testing script file data structure 124.

If testing program 124 discovers that it has reached the last entry in testing event script file data structure 122, as portrayed in FIG. 4, then the process next proceeds to step 324, which depicts testing program 118 publishing a record of its results. This step will typically include storing process log 123 in storage 106 by sending a 'store process log' message 422 to storage 106 and may include delivery of a performance report to user I/O 114. In FIG. 4, delivery of a performance report to user I/O 114 is accomplished as testing program 124 sends a performance report message 420 to I/O control 108. This performance report message causes I/O control 108 to display a performance report on user I/O 114. Once step 324 is completed, the process moves to step 326, which illustrates testing program 124 ending the process of the preferred embodiment of the present invention.

If, in step 322, testing program 124 does not conclude that it has reached the last entry in testing event script file data structure 122, then the process next proceeds to step 312, which depicts the testing program 124 requesting the next testing event data substructure 202 from the testing event script file data structure 122 stored in RAM 102. This step involves a repetition of many of the processes demonstrated in FIG. 4.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

What is claimed is:

1. A computer program product in a computer readable medium for performing testing of a simulated direct access storage device in a testing simulation environment, said computer program product comprising:

instructions on the computer readable medium for providing a software representation of a plurality of hardware components within said simulated direct access storage device;

instructions on the computer readable medium for providing a control program module within said testing simulation environment, wherein said control program module interacts with said software representation of said plurality of hardware components;

instructions on the computer readable medium for providing a testing program for interacting with said control program module and said software representation of said plurality of hardware components;

instructions on the computer readable medium for, in response to detection of an occurrence of a pre-selected event within said simulated direct access storage device, sending one or more codes from said testing program to said software representation of said plurality of hardware components; and instructions on the computer readable medium for determining whether or not a response by said control program module to said one or more codes is correct.

2. The computer program product of claim 1, wherein said plurality of hardware components comprises a microprocessor.

3. The computer program product of claim 1, wherein said one or more codes represent a hardware error event.

4. The computer program product of claim 1, wherein said one or more codes represent a software error event.

5. The computer program product of claim 1, wherein said testing program is a behavior simulation program.

6. The computer program product of claim 1, wherein said one or more codes comprise one or more predefined stimuli and one or more debug instructions.

7. The computer program product of claim 1, wherein said testing program simulates said plurality of hardware components processing said one or more codes in real-time.

8. The computer program product of claim 1, wherein said control program module comprises a control program-under-development for use with a direct access storage device.

9. The computer program product of claim 1, wherein said one or more codes target one or more elements of said control program module.

10. The computer program product of claim 1, wherein said one or more codes target one or more elements of said plurality of hardware components.

11. The computer program product of claim 1, wherein said pre-selected event comprises a return value of a sector read matching a predefined value.

12. The computer program product of claim 1, wherein said pre-selected event further comprises a simulated memory register in said plurality of components reading a predefined value.

13. The computer program product of claim 1, wherein said instructions for sending further comprise instructions for writing a value to a memory register in said plurality of components.

14. The computer program product of claim 1, wherein said instructions for determining further comprise instructions for recording said response.

15. The computer program product of claim 1, wherein said one or more codes are stored in a testing event script file data structure.

16. The computer program product of claim 1, wherein said instructions for determining further comprise instructions for reporting said response to one or more items of user I/O.

17. The computer program product of claim 1, wherein said pre-selected event includes the passage of a predefined length of time.

18. The computer program product of claim 1, wherein said pro-selected event comprises a return value of a sector read not matching a predefined value.

19. The computer program product of claim 1, wherein said pro-selected event comprises said control program module executing a pre-selected instruction.

20. A computer program product in a computer readable medium for performing testing of a simulated direct access storage device in a testing simulation environment, said computer program product comprising:

instructions on the computer readable medium for providing a software representation of a plurality of hardware components, said plurality comprising a microprocessor and one or more application-specific integrated circuits within said simulated direct access storage device;

instructions on the computer readable medium for providing a control program module, comprising a control program under development for use with a direct access storage device, within said testing simulation environment, wherein said control program module interacts with said software representation of said plurality of hardware components;

instructions on the computer readable medium for providing a behavior simulation testing program for interacting with said control program module and said software representation of said plurality of hardware components in real time;

instructions on the computer readable medium for, in response to detection of an occurrence of a pre-selected value in a pre-selected register within said simulated direct access storage device, sending one or more codes, said codes comprising error messages simulating a hardware error event and debug instructions, from a testing script file data structure associated with said testing program to said software representation of said plurality of hardware components by writing said codes to a memory register in said plurality of components;

instructions on the computer readable medium for determining whether or not a response by said control program module and said plurality of hardware components, to said one or more codes is correct;

instructions on the computer readable medium for recording said response;

instructions on the computer readable medium for reporting said response to one or more items of user input/output hardware.

* * * * *

UNITED STATES PATENT AND TRADEMARK OFFICE
CERTIFICATE OF CORRECTION

| | | |
|---|---|---|
| PATENT NO. | : 7,340,661 B2 | Page 1 of 1 |
| APPLICATION NO. | : 10/670548 | |
| DATED | : March 4, 2008 | |
| INVENTOR(S) | : Peter Groz | |

It is certified that error appears in the above-identified patent and that said Letters Patent is hereby corrected as shown below:

In Col. 12, line 5 (Claim 18.), replace "*pro-selected*" with --pre-selected--.

In Col. 12, line 8 (Claim 19.), replace "*pro-selected*" with --pre-selected--.

Signed and Sealed this

Twenty-first Day of October, 2008

JON W. DUDAS
*Director of the United States Patent and Trademark Office*